United States Patent [19]

Ushikoshi

[11] Patent Number: 5,215,501
[45] Date of Patent: Jun. 1, 1993

[54] HYSTERESIS MAGNET COUPLING FOR ROOTS TYPE PUMPS

[75] Inventor: Ryusuke Ushikoshi, Handa, Japan

[73] Assignee: NGK Insulators, Ltd., Japan

[21] Appl. No.: 702,451

[22] Filed: May 16, 1991

Related U.S. Application Data

[63] Continuation of Ser. No. 328,509, Mar. 24, 1989, abandoned.

[30] Foreign Application Priority Data

Mar. 24, 1988 [JP] Japan ................... 63-68277

[51] Int. Cl.⁵ ............................................. F16D 27/00
[52] U.S. Cl. ......................................... 464/17; 415/10; 417/420; 464/29
[58] Field of Search ............ 464/17, 29; 417/420; 415/10

[56] References Cited

U.S. PATENT DOCUMENTS

| | | | |
|---|---|---|---|
| 2,638,558 | 5/1953 | Rankin | 417/420 X |
| 4,115,040 | 9/1978 | Knorr | 464/29 X |
| 4,137,473 | 1/1979 | Pfister | 310/98 |
| 4,277,707 | 7/1981 | Silver et al. | 417/420 X |
| 4,526,518 | 7/1985 | Wiernicki | 417/420 |
| 4,674,960 | 6/1987 | Rando et al. | 417/420 |
| 4,722,661 | 2/1988 | Mizuno | 417/420 X |
| 4,754,181 | 6/1988 | Mizobuchi et al. | 417/420 X |

FOREIGN PATENT DOCUMENTS

| | | | |
|---|---|---|---|
| 2256685 | 7/1975 | France | 417/420 |
| 62-91692 | 4/1987 | Japan . | |
| 1057072 | 2/1967 | United Kingdom . | |

Primary Examiner—Daniel P. Stodola
Assistant Examiner—Tony A. Gayoso
Attorney, Agent, or Firm—Parkhurst, Wendel & Rossi

[57] ABSTRACT

A hysteresis magnet coupling for Roots type pumps comprises a magnet plate holding member connected to either one of a pump shaft or a driving shaft, a hysteresis plate holding member connected to the other of shafts and a diaphragm of a non-magnetic material interposed between a magnetic plate and a hysteresis plate and hermetically sealed at its peripheral portion to a pump housing to prevent heat generated at the hysteresis plate from transferring to the magnet plate to thereby maintain a stabilized operation of the pump.

3 Claims, 5 Drawing Sheets

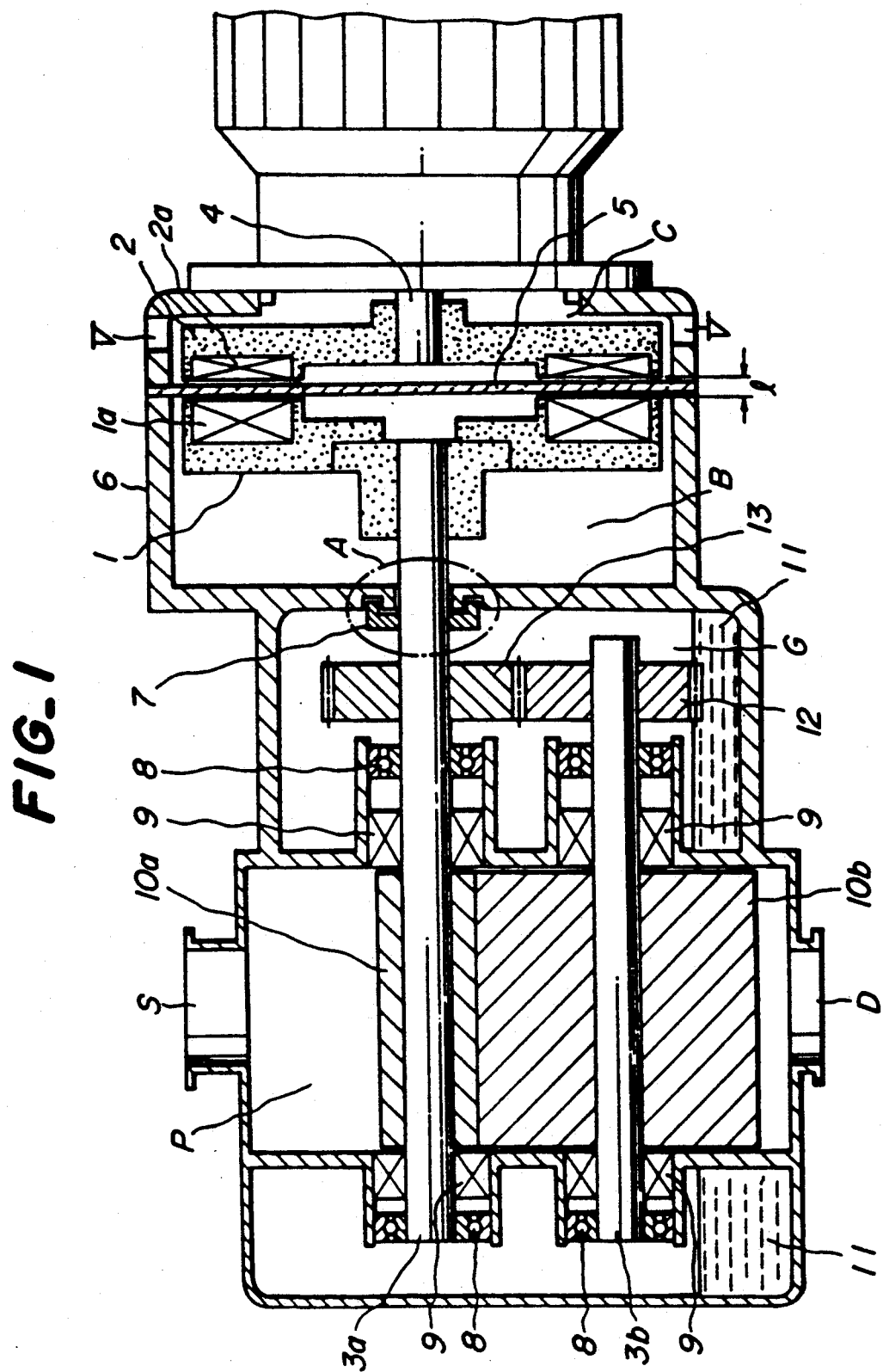
FIG._1

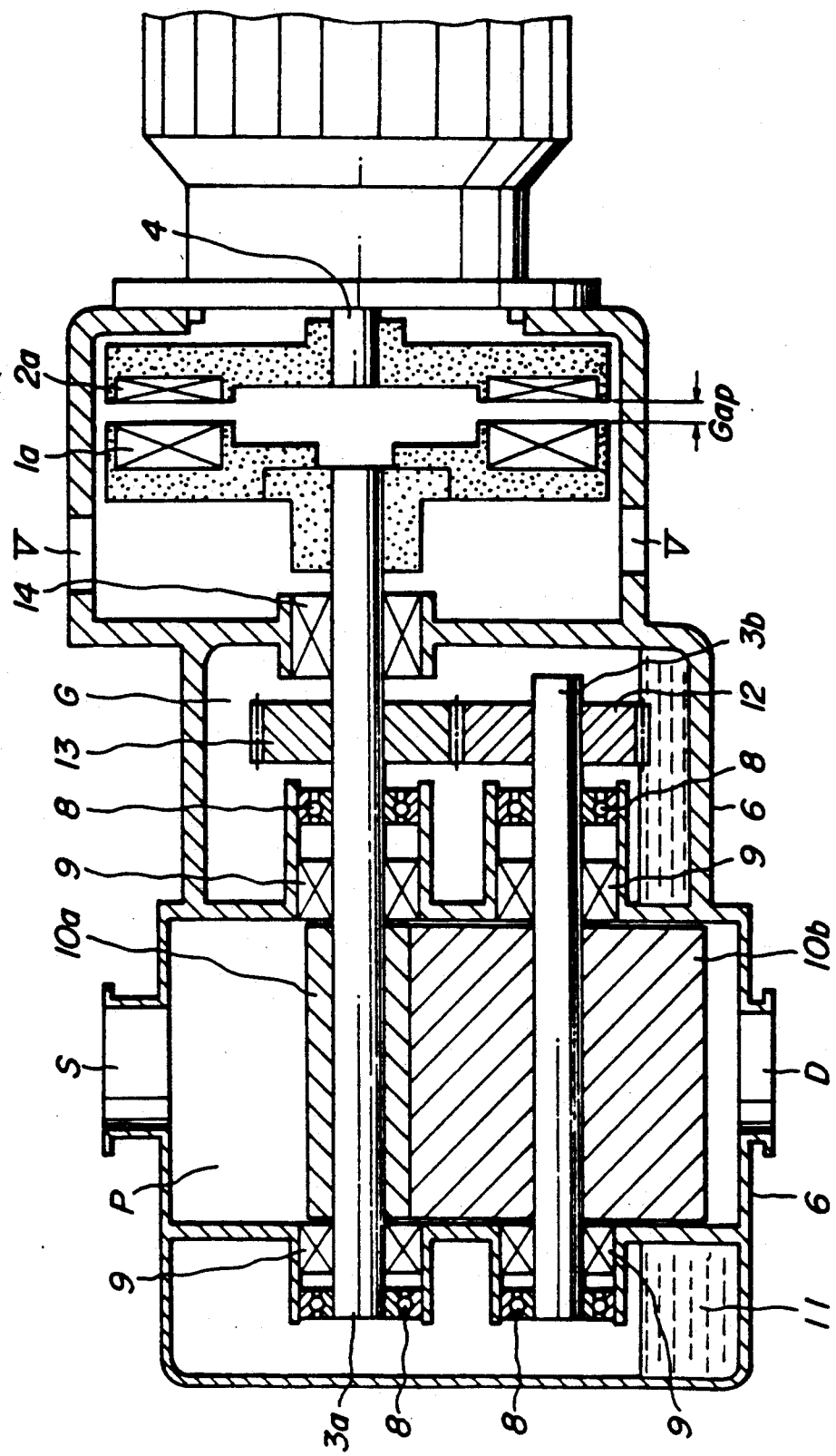

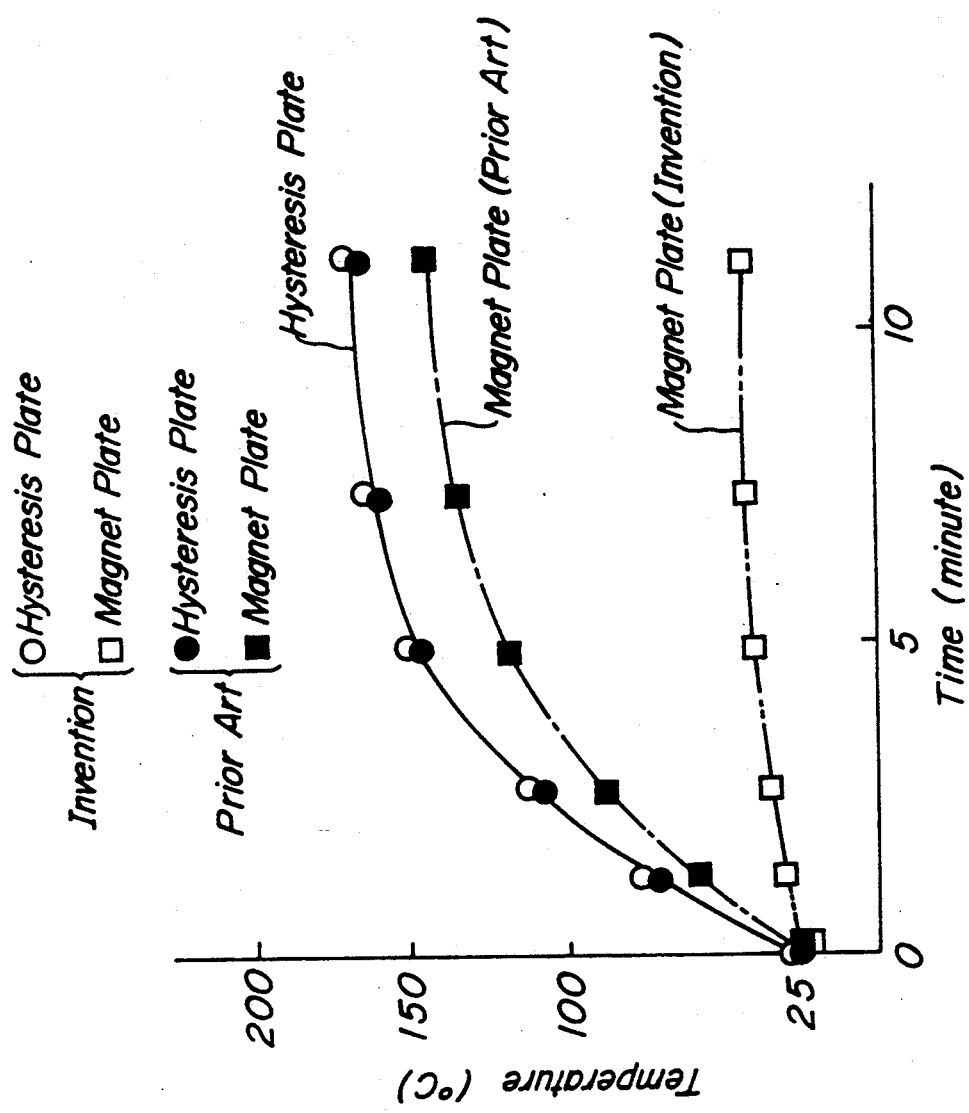

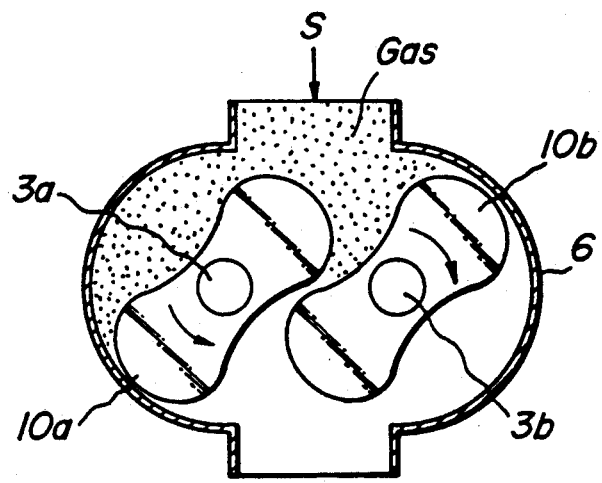
FIG._5a
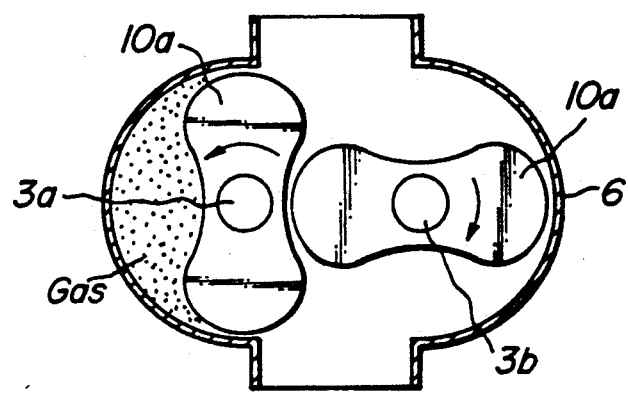
FIG._5b
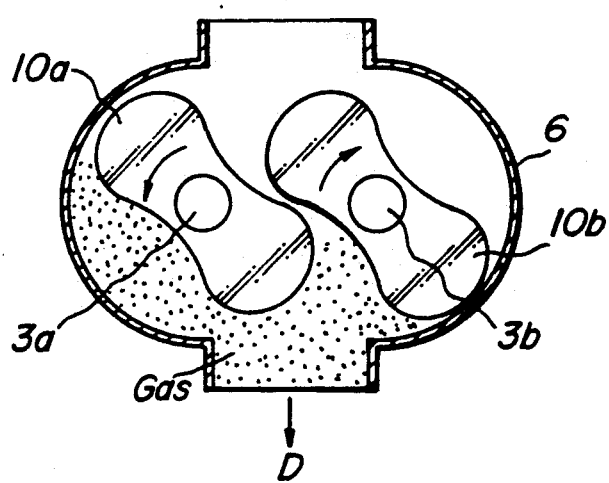
FIG._5c

HYSTERESIS MAGNET COUPLING FOR ROOTS TYPE PUMPS

This is a continuation of application Ser. No. 07/328,509, filed Mar. 24, 1989, now abandoned.

BACKGROUND OF THE INVENTION (1) Field of the Invention

The present invention relates to an improvement of a hysteresis magnet coupling preferably used for Roots type pumps, blowers, vacuum pumps and compressors.

(2) Related Art Statement

Hitherto, the hysteresis coupling comprises a magnet plate holding member provided with a magnet plate and a hysteresis plate holding member provided with a hysteresis plate for transmitting a torque without contact to each other such as to transmit a torque under a slipping condition when the torque exceeds a specified limit during rotation. The hysteresis coupling is generally connected to a machine such as a pump to provide a gap of at most 1 mm between the hysteresis plate and the magnet plate without any interrupter therebetween (see FIG. 2).

Conventional pumps are provided with sealing members such as a mechanical seal, oil seal or the like. In particular, when the hysteresis coupling is applied for a pump provided with a number of sealing members, the following problems result:

(1) Power loss of machine since to the seal member is large and frequently exceeds the torque of the coupling so that the machine can not be started when the machine is operated after a long rest term.

(2) When the machine is operated under an overload, a driving shaft and a pump shaft begin to slip and the hysteresis plate is heated by an eddy current occurring in a magnetic field as the amount of the slippage increases. The heat generated at the hysteresis plate is transferred to the magnet plate and causes the reduction of the magnetic force of the magnet, so that a specified transmitting torque can not be maintained.

(3) The heat transferred to the magnet plate from the hysteresis plate is transferred to the seal members through the pump shaft, resulting in seizure of the seal member of the pump shaft and the others by baking.

SUMMARY OF THE INVENTION

It is an object of the present invention to provide a new and unique coupling adapted for performing a stabilized continuous operation under an overload without the above mentioned drawbacks caused by the slippage of the magnet coupling.

The hysteresis magnet coupling for Roots type pumps according to the present invention comprises a magnet plate holding member provided with a magnet plate and a hysteresis plate holding member provided with a hysteresis plate. One of the members is rigidly connected to a driving shaft driven by a driving device and the other is rigidly connected to a pump shaft of a pump including a pair of Roots type rotors.

The coupling further comprises a diaphragm of a non-magnetic material interposed between the magnet plate and the hysteresis plate and hermetically sealed at its peripheral portion to a pump housing surrounding the rotating members.

The invention will now be described in more detail with reference to the accompanying drawings, in which:

BRIEF DESCRIPTION OF THE DRAWINGS

FIG. 1 is a schematic vertical sectional view of a hysteresis magnet coupling according to the present invention;

FIG. 2 is a schematic vertical sectional view of a hysteresis magnetic coupling according to the prior art;

FIG. 4 is a graph showing temperature variations of magnet plates;

FIGS. 5a, 5b and 5c are schematic views illustrating operation of a pump.

DETAILED DESCRIPTION OF THE INVENTION

Figure 3A:
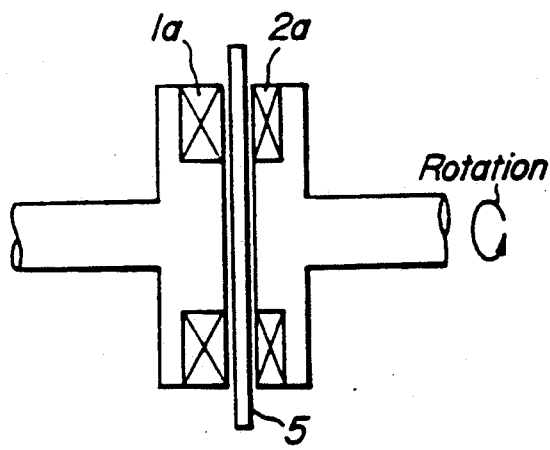
FIGS. 3a-3f are schematic views illustrating diaphragm shapes and mounting constructions.

Referring to FIG. 1, a hysteresis magnet coupling according to the present invention is assembled in a Roots type vacuum pump and its driving device. The hysteresis magnet coupling includes a magnet plate holding member 1 provided with a magnet plate 1a and a hysteresis plate holding member 2 provided with a hysteresis plate 2a. These holding plates 1 and 2 are spaced from each other and rigidly connected to an end of a pump shaft 3a and an end of a motor shaft 4, respectively, a diaphragm 5 of a non-magnetic material being interposed in a space of a width "l" between the magnet plate 1a and the hysteresis plate 2a such as to be out of contact with these plates 1a and 2a. The diaphragm 5 is hermetically sealed at its periphery to a pump housing 6 to divide an inner space within the pump housing 6 to two chambers "B" and "C" containing rotating members 1 and 2, respectively. The pump shaft 3a is extended through an opening in a partition wall from the chamber "B" into a gear chamber "G" and is provided with a slinger 7 so as to cooperate with a groove formed in the partition wall. A portion of the pump housing 6 of the chamber "C" is provided with a plurality of vents "V".

The pump shaft 3a is rotatably supported on side walls of the pump chamber "P" by means of bearings 8 and is sealed by means of seals 9. A first pump rotor 10a is rigidly mounted on the pump shaft 3a and a second pump rotor 10b is also rigidly mounted on a second pump shaft 3b which is rotatably supported in parallel with the pump shaft 3a and is driven through gears 12 and 13 disposed in a gear chamber "G" by the pump shaft 3a to cooperate with each other in a pump chamber "P" having a suction port "S" and a discharge port "D".

The diaphragm interposed between the magnet plate 1a and the hysteresis plate 2a substantially prevents heat generated at the hysteresis plate 2a in the chamber "C" from transferring to the magnet plate 1a during a continuous operation under an overload and shuts the chamber "B" surrounding the holding member 1 secured to the end of the pump shaft 3a from outside air. Accordingly, the opening in the partition wall through which the pump shaft 3a is extended from the chamber "B" into the gear chamber "G" can be provided with a non-contact type seal such as a slinger 7 of simple and inexpensive construction to simply prevent a lubricant oil 11 from leaking out of the gear chamber "G" instead of an expensive contact type mechanical seal shown in FIG. 2 of the prior art which generates substantial heat. Furthermore, it is unnecessary to use such an expensive seal as a magnetic fluid seal or the like.

It is preferable to use a diaphragm satisfying the following conditions:

1) a high heat insulating property for preventing heat generated at the hysteresis plate 2a from transferring to the magnet plate 1a.

2) non-magnetic without affecting the transmittance of a magnetic field between the magnet plate 1a and the hysteresis plate 2a.

3) non-conducting (having a large electric resistance) and not generating an eddy current by a rotation of a magnetic field.

4) a high modulus of elasticity for resisting a differential pressure without contacting of the magnet plate by deforming and to achieve as than as diaphragm as possible, since the transmitting torque is proportional to (space "l")$^{-3}$.

5) a sufficient heat resistance to resist a temperature above 100° C. generated at the hysteresis plate.

The above conditions for the diaphragm can be satisfied by using ceramics, especially partially stabilized zirconia (referred as PSZ hereunder) ceramics having high heat insulating property as shown in Table 1.

Figure 3B:
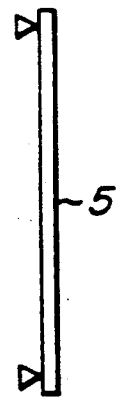
Figure 3C:
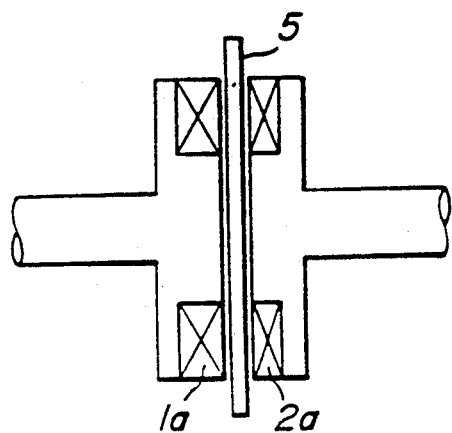
Figure 3D:
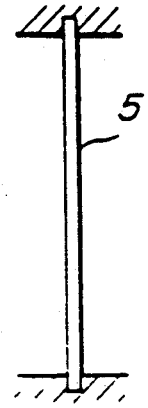
Figure 3E:
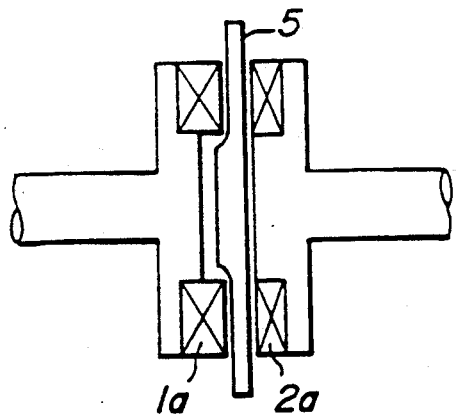
Figure 3F:
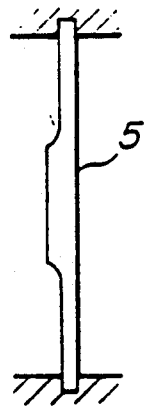

The diaphragm may be fixed at its peripheral portion only in the axial direction or may be completely fixed and the shape of its section may be varied according to the construction of the coupling as shown in FIGS. 3b, 3d, and 3f. In the case of a diaphragm being deformed and stressed by the differential pressure, the shape shown in FIG. 3c is most effective for decreasing the deformation.

TABLE 1

| | Non-magnetic property | Electric insulating property | Modulus of elasticity ($\times 10^4$ kg/mm$^2$) | Temperature (more than 100° C.) | Heat conductivity (cal/cm, °C., s) |
|---|---|---|---|---|---|
| Metal | | | | | |
| Carbon steel | X | X | 2.1 | ◯ | 0.12 |
| Stainless steel | ◯ | X | 1.77 | ◯ | 0.04 |
| Phenol resin | ◯ | ◯ | 0.0011 | X | 0.0008 |
| SiC (silicon carbide) | ◯ | ◯ | 3.6 | ◯ | 0.31 |
| SSN (Silicon nitride) | ◯ | ◯ | 2.3 | ◯ | 0.07 |
| Al$_2$O$_3$ | ◯ | ◯ | 3.0 | ◯ | 0.04 |
| PSZ | ◯ | ◯ | 2.1 | ◯ | 0.007 |

◯ has a faculty or can be used
X has no faculty or can not be used

Referring to FIG. 1, the hysteresis plate should be connected to the drive shaft (Motor shaft 4) rather than to driven shaft (Pump shaft 3a) to prevent heat generated at the hysteresis plate 2a from transferring to the pump shaft 3a. Particularly, in order to release the heat generated at the hysteresis plate 2a during slipping of the coupling to the air from vents, the hysteresis plate 2a is preferably connected to the driving shaft which is rotated at a high number of revolution and is effectively cooled by the atmosphere. The housing surrounding the holding members of the hysteresis plate should be opened to the air in order to release heat of the hysteresis plate to the air. The type of coupling is not limited to the disk shape, but may be cylindrical shaped.

In the embodiment shown in FIG. 1, the magnet plate 1a is spaced from the hysteresis plate 2a by 4 mm and the diaphragm of PSZ ceramics of 3.0 mm in thickness is interposed between the magnet plate 1 and the hysteresis plate 2a. A vacuum pump having a discharge port of 50 mm in diameter is used and operated in a condition mentioned below, to measure a temperature variation of the magnet plate 1a. Results of tests of the present invention are shown in FIG. 4 together with results of the comparative prior art having a setting of 0.5 mm gap between a magnet plate and a hysteresis plate without the diaphragm. The operation modes of the pump are shown in FIGS. 5a, 5b, 5c, respectively.

| An operation condition | |
|---|---|
| Rotational speed of motor | 3,500 rpm |
| Free gas displacement | 100 m$^3$/hr |
| Useful end vacuum | 2 × 10$^{-2}$ torr |
| Difference of rotational speed between motor shaft and pump shaft | 2,000 rpm |
| Revolutional speed of pump shaft | 1,500 rpm |
| Specified magnetic coupling torque | 13 kg · cm |
| Motor size | 0.75 KW |

It is noted that the hysteresis coupling of the embodiment has a distance "l" of 4 mm which is larger than that of the prior art, and therefore, the size of the coupling is increased to unify the specified torque.

As seen from FIG. 4, according to the present invention the temperature of the magnet plate after 5 minutes since the motor was started is 15° C., after which time its temperature rise is small, such that the reduction of magnetic force of the magnet is small. Accordingly, an inexpensive magnet which is unusable in a temperature higher than 100° C. is applicable.

According to the present invention, even if the hysteresis plate is heated by a slippage, during a continuous operation under an overload, the transfer of the heat can be minimized so that heating-up of pump members rotating at a high speed in the pump chamber and a deterioration of viscosity of a lubricant oil by its temperature increase are avoided. Accordingly, the specified torque can be maintained and the operation can be stabilized. Furthermore, a semipermanent seal can be provided without use of a mechanical seal or the other which causes a large power loss and cannot keep a complete seal.

What is claimed is:

1. A Roots type apparatus adapted for transmission of torque during continuous operation under an overload condition, having a nonsynchronous hysteresis magnetic coupling, comprising:

a Roots type pump which includes a pair of Roots type rotors and has a pump shaft extending therefrom;

a drive device having a driving shaft extending therefrom for driving said pump;

a magnet plate holding member which is provided with a magnetic plate and connected to said pump shaft;

a hysteresis plate holding member which is provided with a hysteresis plate and connected to said driving shaft such that said hysteresis plate is opposite said magnetic plate;

a pump housing surrounding said magnet plate holding member and said hysteresis plate holding member;

a diaphragm of a non-magnetic, heat insulating, non-conductive ceramic material which is interposed between said magnetic plate and said hysteresis plate and connected at a peripheral portion to said pump housing thereby dividing said pump housing into a drive side portion enclosing said hysteresis plate holding member and a load side portion enclosing said magnetic plate holding member, wherein said diaphragm prevents substantially all heat transfer from the hysteresis plate to the magnetic plate through said diaphragm; and at least one vent provided in said side portion of said pump housing at a portion of said pump housing which surrounds said hysteresis plate, said vent being open to the atmosphere to allow heat flow therethrough to cool said hysteresis plate thereby substantially preventing the Roots type pump and the pump shaft from over heating by heat generated in the hysteresis plate during an overload condition.

2. The apparatus of claim 1, wherein the diaphragm of the non-magnetic material is hermetically sealed at the peripheral portion to the pump housing.

3. The apparatus of claim 1, wherein the ceramic material is partially stabilized zirconia.

* * * * *